United States Patent Office 2,776,806
Patented Jan. 8, 1957

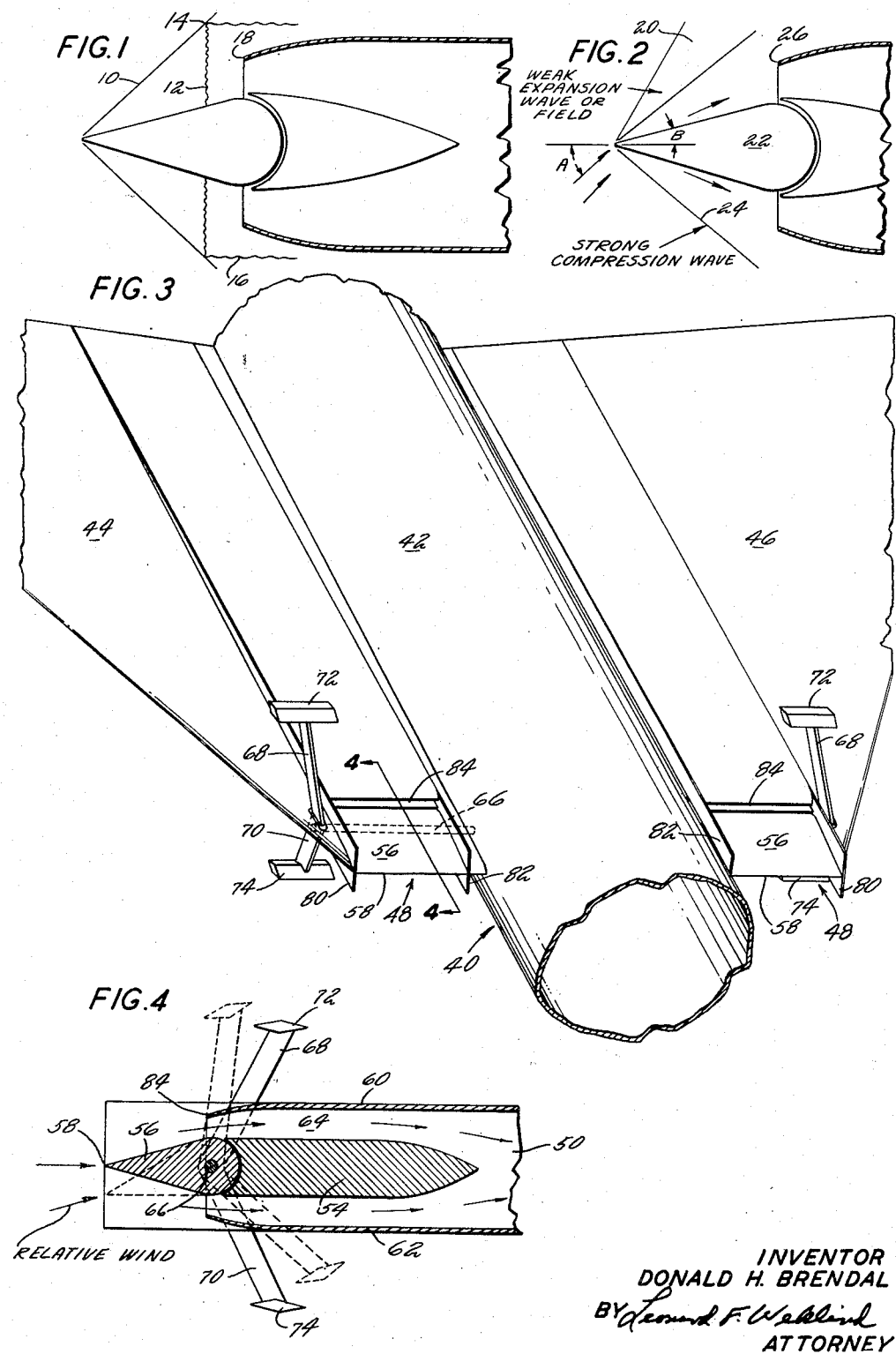

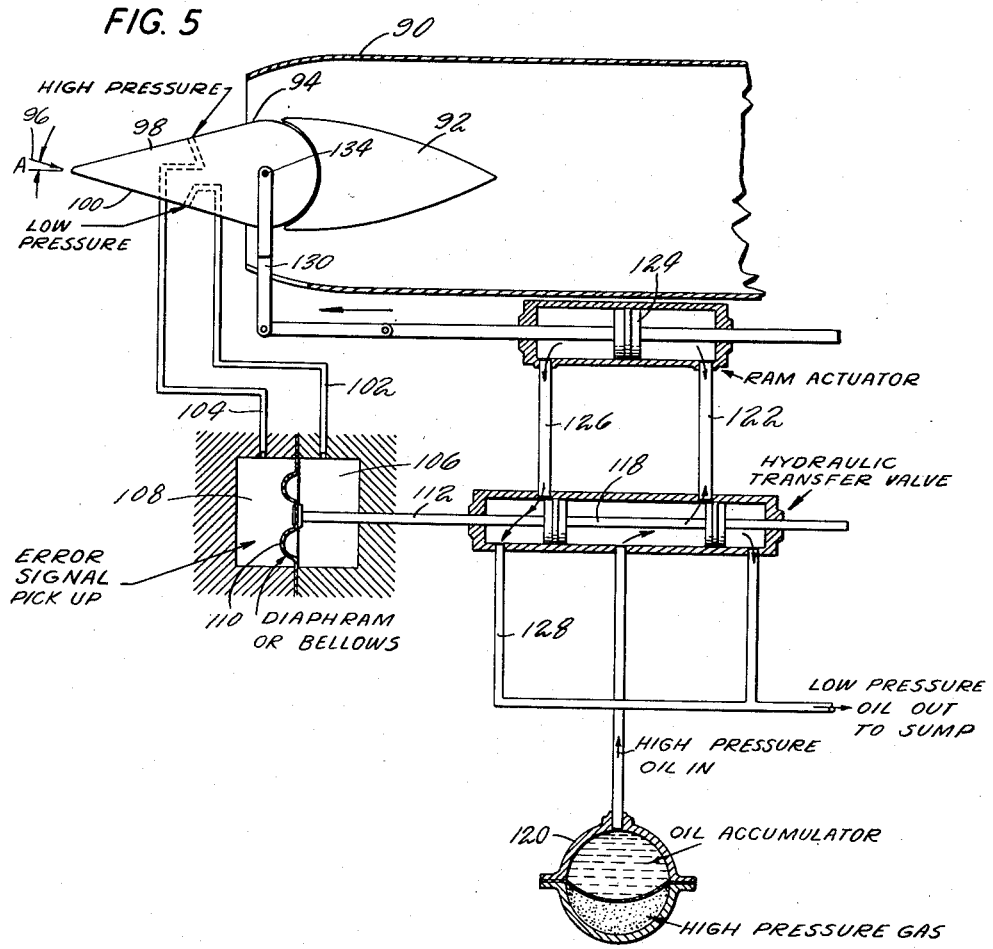

2,776,806

WEATHERCOCKING SUPERSONIC WEDGE DIFFUSER FOR AIR INLETS IN AIRCRAFT

Donald H. Brendal, South Glastonbury, Conn., assignor to United Aircraft Corporation, East Hartford, Conn., a corporation of Delaware Application February 5, 1954, Serial No. 408,391

11 Claims. (Cl. 244—53)

This invention relates to supersonic inlets and more particularly to wedge-type inlets and diffusers.

It is an object of this invention to provide a wedge inlet-diffuser combination which will provide maximum pressure recovery under varied angles of attack and yaw.

It is another object of this invention to provide a supersonic wedge inlet and diffuser which will automatically provide shock stability and high pressure recovery under varied relative angles of the approaching airstream and over a wide Mach number range.

These and other objects of this invention will be readily apparent from the following detail description of the drawings in which:

Fig. 1 is a cross section of a wedge-type diffuser including the shock wave pattern in schematic.

Fig. 2 is a partial cross-sectional view schematically illustrating the shock wave pattern on a wedge diffuser at high angle of attack.

Fig. 3 is a partial perspective view of a vehicle having the wedge type inlet-diffuser construction according to this invention.

Fig. 4 is a partial cross-sectional view taken along the line 4—4 of Fig. 3; and Fig. 5 is a diagrammatical illustration of a modified servo mechanism for varying the wedge angle.

As compared to conical shock diffusers the two-dimensional wedge-type diffuser has a relatively small angle wedge; hence, the difference between the oblique shock angle and the wedge angle is relatively large for the latter type diffuser. As a result of the nature of the shock angles, the wedge angle and the diffuser lip angle, a wedge-type inlet offers a high degree of shock stability over a large Mach number range. As seen in Fig. 1, for example, the oblique shock wave 10 and the normal shock wave 12 for a highly detached condition intersect at a point 14 so that the resulting disturbance indicated at 16 is displaced sufficiently outward from the inlet axis that there is no danger of feeding this disturbance inside the diffuser lip 18.

A disadvantage of a fixed wedge diffuser stems from the low wedge angles desired and inasmuch as the required operational angles of attack may be greater than the wedge half angle there may be large differences in the strength of the shocks on the two sides of the wedge. Thus, as shown in Fig. 2, where the relative angle of attack A of the oncoming airstream is of greater magnitude than the wedge half angle B a weak expansion wave or field 20 is produced on one major side of the wedge 22 and a strong compression wave 24 is produced on the other major side of the wedge. Such a condition will obviously result in large differences in pressure recovery at the lip 26 of the diffuser inlet and large losses in overall pressure recovery. It will be apparent that where the relative angle of attack is less than the wedge half angle but other than zero this problem is not as severe since no expansion wave is produced as a result of the air having to move around a sharp corner and the two compression waves are more equal in strength.

The foregoing disadvantage can be alleviated by a weathercocking wedge which can be maintained at or near a zero angle of attack relative to the oncoming airstream thus retaining a symmetrical wedge oblique shock configuration. Since a simple hinged wedge presents a statically unstable configuration it is the purpose of this invention to provide a stable balancing servo device which will maintain the wedge at or near to a zero angle of attack.

Referring to Fig. 3, a supersonic vehicle is generally indicated at 40 and includes a fuselage 42 and laterally extending wings 44 and 46. The wing roots contain wedge type diffuser inlets generally indicated at 48 which in turn communicate with ducts such as 50, illustrated in Fig. 4. Each of the diffusers include a central member 54 which has an upstream wedge portion 56 which terminates in a sharp leading edge 58. The wedge portion 56 and the member 54 cooperate with the walls 60, 62 to form a diffuser passage 64 which communicates with the inlet passage 50. Passage 50 may lead to a ramjet or turbojet power plant or any other form of air consuming device.

In order to insure that the wedge portion 56 remains at or near a zero angle of attack relative to the oncoming stream, the wedge 56 is pivotally mounted by means of a shaft 66 mounted for pivotal movement at its extremities by any suitable means. Fixed to the shaft 66 are two arms 68 and 70 which are swept back at some suitable angle. The free ends of the arms 68 and 70 carry airfoils or vanes 72 and 74, respectively. Thus it will be apparent that should the relative wind assume a position shown in Fig. 4, the vanes 72 and 74 will align themselves with the relative wind so as to pivot the wedge 56 into the dotted line position illustrated. Thus under varied positive and negative angles of attack the wedge 56 will become aligned with the relative wind so as to avoid the production of unsymmetrical shock waves.

A pair of fences 80 and 82 extend forwardly of the lip 84 of the diffuser and terminate adjacent the leading edge 58 of the wedge 56. The fences 80 and 82 define a passage therebetween for the air which flows over the wedge 56 and then into the diffuser inlet. The fence 82 is laterally spaced from the fuselage 42 thereby permitting boundary layer air which builds up on the fuselage surface upstream of the inlet to be by-passed around the inlet and shed downstream along the junction of the wing and fuselage. The wedge 56 would be constructed so that it would be statically balanced in the straight forward or axial position so that it would maintain this position at zero or low forward speeds of the vehicle.

In the event that the use of arms such as 68 and 70 and vanes such as 72 and 74 (Fig. 4) present a structural problem or cause excessive drag, it may be desirable to utilize a servo mechanism such as that illustrated in Fig. 5. Herein a diffuser 90 is illustrated as having a central member 92 and a pivoted wedge 94. This structure is similar to that illustrated in Figs. 3 and 4. In the event that the relative wind assumes the position illustrated by the arrow 96 the pressure on the top major surface 98 will be higher than the pressure on the bottom major surface 100 of the wedge 94. These pressures are conducted by lines 102 and 104 to chambers 106 and 108, respectively. The pressure differential will deflect the diaphragm 110 which in turn will produce a motion in the rod 112 commensurate with the signal error or pressure differential. This signal or motion of the rod 112 will move the pilot valve 118 to the right as illustrated thereby permitting high pressure fluid from the power source 120 to flow through the line 122 to the right side of the piston 124. The left side of the piston 124 has its adjacent chamber then connected via the line 126 to the drain or low pressure line 128. In the position of the pilot valve, as illustrated, the servo piston 124 will move to the left thereby moving the bellcrank 130 so as to move the wedge 98 upwardly about its pivot 134. This upward motion will continue until the wedge is in alignment with the relative wind at which time the pressures on either major surface of the wedge will equalize thereby returning the diaphragm 110 and the pilot valve 118 to the neutral position. It will be apparent that with the wedge being at a positive angle of attack with the relative wind the reverse operation of the servo mechanism will ensue.

It will be apparent that as a result of this invention a simple but highly stable wedge-type inlet-diffuser structure is provided whereby efficient operation and high pressure recovery is obtainable over a wide range of Mach numbers and at varied angles of attack.

What it is desired to obtain by Letters Patent is:

1. In a fluid inlet adapted to operate in fluids of relative supersonic velocities, the inlet including an opening defined by a leading edge, a streamlined member protruding upstream of said leading edge and extending aft within said opening, and means for pivotally mounting the portion of said member which extends upstream of said leading edge adjacent its aft end.

2. In a vehicle adapted to operate in an airstream of relative supersonic velocities, a fuselage, an air inlet carried by said fuselage including an opening defined by a lip and a duct downstream of said lip, a wedge located in said duct forming a diffuser, said wedge terminating in a sharp leading edge located upstream of said lip, means for pivotally supporting an upstream portion of said wedge including said leading edge, and means for moving said upstream portion about said pivotal support relative to the downstream portion of said wedge.

3. In a fluid inlet adapted to receive fluids from a stream of relative supersonic velocities, the inlet including a straight-sided opening defined by a leading edge lip, a streamlined member centrally located in said opening and forming a passageway between said lip and member, said member terminating in a sharp leading edge upstream of said lip and being pivotally mounted adjacent said lip, and means responsive to the relative direction of the fluid stream with respect to said opening for moving said member about its pivot.

4. In a fluid inlet adapted to receive fluids from a stream of relative supersonic velocity, the inlet including an opening defined by a leading edge, a streamlined member symmetrically disposed within said opening and terminating in a sharp leading edge upstream of said first-mentioned leading edge, and means for pivotally mounting an upstream portion of said member at a point adjacent to said first-mentioned lip, and means for moving said upstream portion about its pivotal mounting including mechanism responsive to the angle of attack of the fluid stream relative to said opening for aligning said member with the relative stream and maintaining said member at zero angle of attack relative to the stream.

5. In a fluid inlet adapted to receive fluid from a stream of relative supersonic velocities and having a wedge diffuser, said diffuser including an outer diffuser wall having an upstream lip and a wedge located in the inlet and forming the inner wall of said diffuser, said wedge having a sharp leading edge located upstream of said lip and adapted to form in the stream an attached shock which extends outwardly and rearwardly thereof but forward of said lip, said wedge including an aft stationary portion forming a continuation of said leading edge portion, and means for obtaining maximum pressure recovery in said diffuser during varied relative angles of attack of the fluid stream comprising a pivot for the leading edge portion of said wedge and mechanism for moving the leading edge portion of said wedge about said pivot in response to variations of angle of attack of the fluid stream.

6. In a vehicle adapted to operate in an airstream of relative supersonic velocities, a fuselage, an air inlet carried by said fuselage including an opening defined by a lip and a duct downstream of said lip, said lip being spaced from said fuselage, a wedge located in said duct forming a diffuser, said wedge terminating in a sharp leading edge located upstream of said lip, means for pivotally supporting an upstream portion of said wedge including said leading edge, said supporting means being adjacent the aft end of said upstream portion, means for moving said upstream portion about said pivotal support, and wall means extending upstream from a portion of the periphery of said lip and located adjacent the side of said wedge nearest said fuselage, said wall means being spaced from said fuselage and being substantially coterminous with said leading edge whereby boundary layer air on said fuselage is by-passed from said opening.

7. In a vehicle adapted to operate in an airstream of relative supersonic velocities, a fuselage, an air inlet carried by said fuselage including an opening defined by a lip and a duct downstream of said lip, a streamlined member located in said inlet and forming a diffuser passageway with said duct, said member spanning said opening and including an upstream portion terminating in a sharp leading edge upstream of said lip, said upstream portion having two major surfaces and being mounted for pivotal movement about an axis substantially parallel to the plane of said surfaces, and means for moving said upstream portion about its pivot including means responsive to the relative pressures on said major surfaces.

8. In a vehicle adapted to operate in an airstream of relative supersonic velocities, a fuselage, an air inlet carried by said fuselage including an opening defined by a lip and a duct downstream of said lip, a streamlined member located in said inlet and forming a diffuser passageway with said duct, said member spanning said opening and including an upstream portion terminating in a sharp leading edge upstream of said lip, said upstream portion having two major surfaces and being mounted for pivotal movement about an axis substantially parallel to the plane of said surfaces, means for sensing the pressure on each of said major surfaces, means for comparing said pressures and producing a signal, a servo motor, a source of power, means for controlling the flow of power from said source to said servo motor including operative connections to said signal producing means, and means connecting said servo motor to said upstream portion for moving the latter about its pivot.

9. In a fluid inlet adapted to receive fluids from a stream of relative supersonic velocity, the inlet including an opening defined by a leading edge, a streamlined member symmetrically disposed within said opening and terminating in a sharp leading edge upstream of said first mentioned leading edge, said member comprising two separate sections, one of said sections extending substantially from said first mentioned leading edge upstream to said second mentioned leading edge, the other of said sections being fixed and extending from said opening downstream into said inlet, means for pivotally mounting said one portion adjacent its trailing edge and at a point adjacent said first mentioned leading edge, and means for moving said one portion about its pivot.

10. In a fluid inlet adapted to receive fluids from a stream of relative supersonic velocities, the inlet including a straight-sided opening defined by a leading edge lip, a streamlined member centrally located in said inlet and forming a passageway between said lip and member, said member including upstream and downstream portions, said upstream portion extending from said opening and terminating in a sharp leading edge upstream of said lip, said downstream portion extending aft into said inlet and forming a streamlined continuation of said upstream portion, means for pivotally mounting said upstream portion adjacent its aft end, and means for moving said member about its pivot.

11. A fluid inlet according to claim 10 wherein said last mentioned means includes a device for sensing the angle of attack of the fluid stream relative to said upstream portion of said streamlined member and a servo device operatively connected to said sensing device and said upstream portion, said sensing device controlling said servo device and said upstream portion.

References Cited in the file of this patent

UNITED STATES PATENTS

| | | |
|---|---|---|
| 2,384,893 | Crook | Sept. 18, 1945 |
| 2,573,834 | Davidson | Nov. 6, 1951 |